US006969819B1

(12) United States Patent
Griffin

(10) Patent No.: US 6,969,819 B1
(45) Date of Patent: Nov. 29, 2005

(54) PLASMA ARC TORCH

(75) Inventor: David Charles Griffin, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 10/848,546

(22) Filed: May 18, 2004

(51) Int. Cl.[7] .................................................. B23K 9/00
(52) U.S. Cl. ............................. 219/121.48; 219/121.52
(58) Field of Search ...................... 219/121.36, 121.38, 219/121.39, 121.4, 121.45, 121.47, 121.48, 219/121.49, 121.5, 121.51, 121.52, 121.55, 219/121.57

(56) References Cited

U.S. PATENT DOCUMENTS

| | | | |
|---|---|---|---|
| 2,784,294 | A | 3/1957 | Gravert |
| 2,898,441 | A | 8/1959 | Reed et al. |
| 2,923,809 | A | 2/1960 | Clews et al. |
| 3,004,189 | A | 10/1961 | Giannini |
| 3,042,830 | A | 7/1962 | Orbach |
| 3,082,314 | A | 3/1963 | Arata et al. |
| 3,131,288 | A | 4/1964 | Browning |
| 3,242,305 | A | 3/1966 | Kane et al. |
| 3,450,926 | A | 6/1969 | Kiernan |
| 3,493,717 | A | 2/1970 | Sciaky |
| 3,534,388 | A | 10/1970 | Ito et al. |
| 3,562,486 | A | 2/1971 | Hatch et al. |
| 3,609,282 | A | 9/1971 | Trattner et al. |
| 3,619,549 | A | 11/1971 | Hogan et al. |
| 3,641,308 | A | 2/1972 | Couch, Jr. et al. |
| 3,669,354 | A | 6/1972 | Helyer |
| 3,787,247 | A | 1/1974 | Couch, Jr. |
| 3,833,787 | A | 9/1974 | Couch, Jr. |
| 4,203,022 | A | 5/1980 | Couch, Jr. et al. |
| 4,463,245 | A | 7/1984 | McNeil |
| 4,558,201 | A | 12/1985 | Hatch |
| 4,567,346 | A | 1/1986 | Marhic |
| 4,580,032 | A | 4/1986 | Carkhuff |
| 4,585,921 | A | 4/1986 | Wilkins et al. |
| 4,590,354 | A | 5/1986 | Marhic et al. |
| 4,598,191 | A | 7/1986 | Marhic et al. |
| 4,650,953 | A | 3/1987 | Eger et al. |
| 4,663,512 | A | 5/1987 | Kneeland et al. |
| 4,663,515 | A | 5/1987 | Kneeland et al. |
| 4,691,094 | A | 9/1987 | Hatch et al. |
| 4,701,590 | A | 10/1987 | Hatch |
| 4,767,908 | A | 8/1988 | Dallavalle et al. |
| 4,777,342 | A | 10/1988 | Hafner |
| 4,788,408 | A | 11/1988 | Wlodarczyk et al. |

(Continued)

FOREIGN PATENT DOCUMENTS

| | | |
|---|---|---|
| EP | 0 157 702 A2 | 10/1985 |

(Continued)

*Primary Examiner*—Tu Hoang
(74) *Attorney, Agent, or Firm*—Alston & Bird LLP

(57) ABSTRACT

A plasma torch is provided having a tubular member defining a bore extending axially between first and second ends, and nozzle engaged with the first end. A movable member is engaged in the tubular member bore, and includes a first end disposed toward the nozzle and a second end, with a piston member engaged therewith away from the first end. An electrode has a first portion defining a bore and is received by the movable member first end. The electrode has a second portion extending outwardly from the movable member first end toward the nozzle, and a radially outward-extending medial flange between the first and second portions axially outward of the movable member first end. The electrode is movable between an inoperable position in contact with the nozzle and an operable position separated from the nozzle and the medial flange in contact with the tubular member first end.

11 Claims, 2 Drawing Sheets

U.S. PATENT DOCUMENTS

Figure 1:
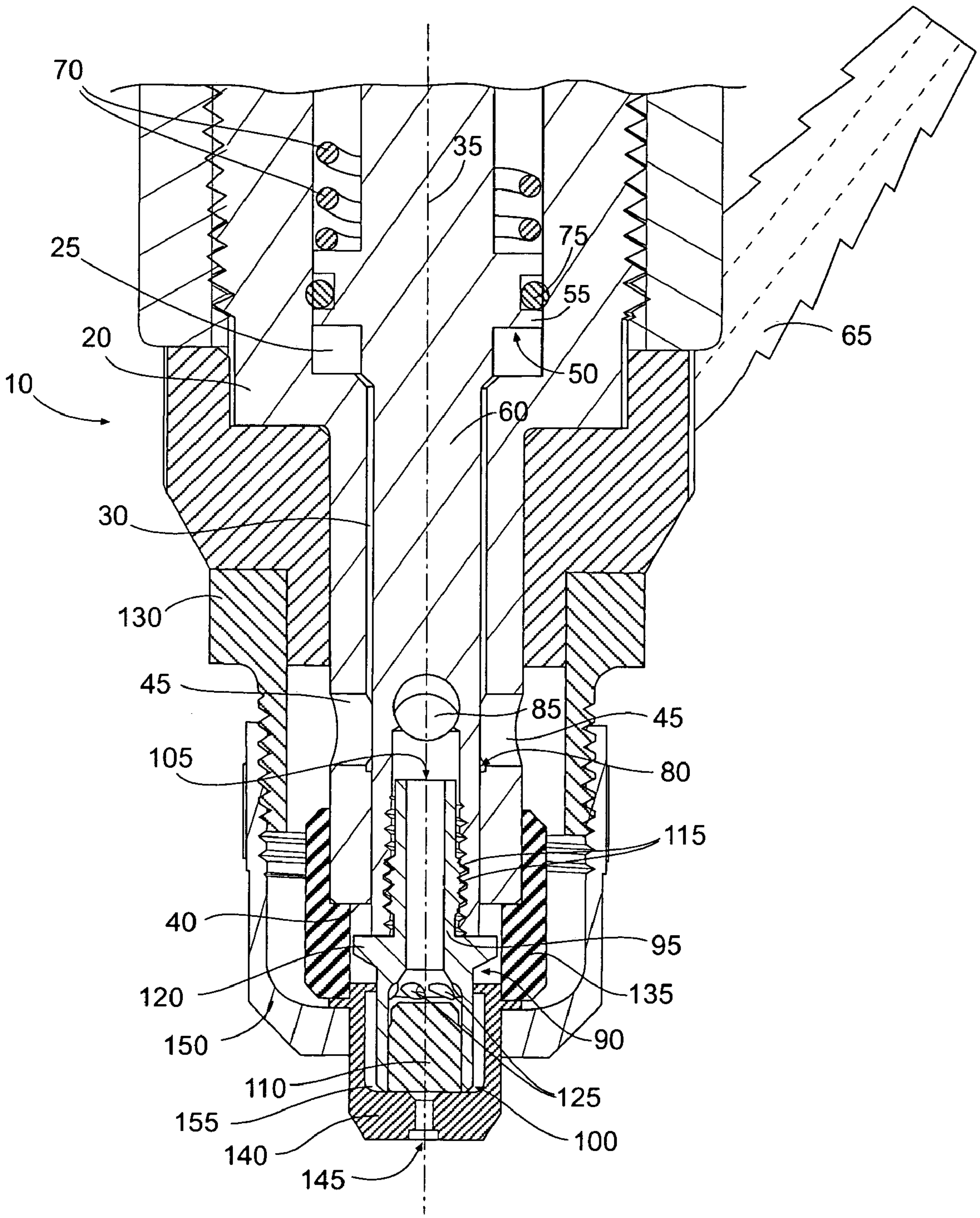

| | | | | |
|---|---|---|---|---|
| 4,791,268 | A | | 12/1988 | Sanders et al. |
| 4,877,937 | A | | 10/1989 | Müller |
| 4,902,871 | A | | 2/1990 | Sanders et al. |
| 4,940,877 | A | | 7/1990 | Broberg |
| 4,973,816 | A | | 11/1990 | Haberman |
| 4,992,642 | A | | 2/1991 | Kamp et al. |
| 5,023,425 | A | | 6/1991 | Severance, Jr. |
| 5,164,569 | A | | 11/1992 | Porra et al. |
| 5,216,221 | A | | 6/1993 | Carkhuff |
| 5,278,388 | A | | 1/1994 | Huang |
| 5,409,164 | A | | 4/1995 | Delzenne et al. |
| 5,416,296 | A | | 5/1995 | Walters |
| 5,597,497 | A | | 1/1997 | Dean et al. |
| 5,681,489 | A | | 10/1997 | Carkhuff |
| 5,726,412 | A | | 3/1998 | Briffod et al. |
| 5,796,067 | A | | 8/1998 | Enyedy et al. |
| 5,856,647 | A | | 1/1999 | Luo |
| 5,859,403 | A | | 1/1999 | Zigliotto |
| 5,886,315 | A | | 3/1999 | Lu et al. |
| 5,893,985 | A | | 4/1999 | Luo et al. |
| 5,897,795 | A | | 4/1999 | Lu et al. |
| 5,938,949 | A | | 8/1999 | Enyedy et al. |
| 5,965,040 | A | | 10/1999 | Luo et al. |
| 5,994,663 | A | | 11/1999 | Lu |
| 6,084,199 | A | | 7/2000 | Lindsay et al. |
| 6,207,923 | B1 | | 3/2001 | Lindsay |
| 6,362,450 | B1 | | 3/2002 | Severance, Jr. |
| 6,403,915 | B1 | | 6/2002 | Cook et al. |
| 6,677,551 | B2 | * | 1/2004 | Hardwick .............. 219/121.54 |
| 6,685,562 | B1 | | 2/2004 | Rantanen |
| 2002/0117482 | A1 | | 8/2002 | Hewett et al. |
| 2002/0117483 | A1 | | 8/2002 | Jones et al. |
| 2002/0117484 | A1 | | 8/2002 | Jones et al. |

FOREIGN PATENT DOCUMENTS

| | | | |
|---|---|---|---|
| EP | 0 159 256 | A1 | 10/1985 |
| EP | 0 591 018 | A1 | 4/1994 |
| FI | 109278 | | 10/1974 |
| FR | 2003979 | A | 11/1969 |
| FR | 2036565 | A | 12/1970 |
| FR | 2135469 | A | 12/1972 |
| FR | 2669846 | A | 6/1992 |
| FR | 2669847 | A1 | 6/1992 |
| RO | 110427 | B1 | 1/1996 |

* cited by examiner

PLASMA ARC TORCH

BACKGROUND OF THE INVENTION

1. Field of the Invention

The present invention relates to a plasma arc torch and, more particularly, to a plasma arc torch with improved electrode cooling and/or safety provisions.

2. Description of Related Art

Blowback type plasma torches are generally configured such that an electrode and a nozzle can be brought into contact with each other to ignite an arc, whereafter, the electrode is separated from the nozzle so as to draw the arc therebetween. A fluid, such as air, is concurrently provided under pressure through the nozzle, wherein the air flow interacts with the drawn arc so as to form a plasma. The plasma flowing through the nozzle is then directed at a workpiece to perform a cutting function.

In some instances, the fluid for forming the plasma is also used to cool the electrode and nozzle. That is, the formation of the plasma generally requires a limited amount of, for example, air. As such, the remainder of the fluid can be used for other purposes, such as to cool the electrode and nozzle that are heated by passage of the arc and by the plasma. Cooling of the electrode and nozzle may provide, for example, greater plasma stability and cutting performance, and may also lengthen the service life of the torch components. In some instances, such torches may also be configured to have a relatively compact size, with respect to both the components and the overall assembly. Accordingly, another consideration with these torches is safety, since the torch must incorporate a power feed for providing the arc, and must provide sufficient cooling to prevent catastrophic failure of the torch due to overheating. These considerations must also be implemented in the components of the torch assembly, since proper cooperation of the torch components may also be critical to safety and efficient performance.

Thus, there exists a need for a plasma arc torch, particularly a blowback type of plasma arc torch, having improved electrode and/or nozzle cooling characteristics for providing, for example, greater plasma stability, enhanced and/or consistent cutting performance, and an improved service life. Such a blowback type plasma torch should also facilitate safety, for example, by providing components configured to be formed into a torch assembly in a precise and consistent manner.

BRIEF SUMMARY OF THE INVENTION

The above and other needs are met by the present invention which, in one embodiment, provides a plasma torch having a tubular member with opposing first and second ends and defining a bore extending axially between the ends, as well as a nozzle operably engaged with the first end of the tubular member. A movable member is movably engaged with the tubular member axially within the bore, and includes a first end disposed toward the nozzle and an opposing second end. A piston member is operably engaged with the movable member away from the first end thereof. An electrode, having a first portion defining a bore, is configured to be received by the first end of the movable member, wherein the electrode also has a second portion extending outwardly from the first end of the movable member toward the nozzle. The electrode further includes a radially outward-extending medial flange disposed between the first and second portions axially outward of the first end of the movable member. The electrode is configured to be movable by the piston member, via the movable member, between an inoperable position where the electrode is in contact with the nozzle and an operable position where the electrode is separated from the nozzle and the medial flange is in contact with the first end of the tubular member.

Embodiments of the present invention thus provide a blowback type of plasma arc torch having improved electrode and/or nozzle cooling characteristics. Such a blowback type plasma torch also facilitates safety, for example, by providing components configured to be formed into a torch assembly in a precise and consistent manner, whereby proper assembly or reassembly of the torch may be readily assured. These and other significant advantages are provided by embodiments of the present invention, as described further herein.

BRIEF DESCRIPTION OF THE SEVERAL VIEWS OF THE DRAWING(S)

Figure 2:
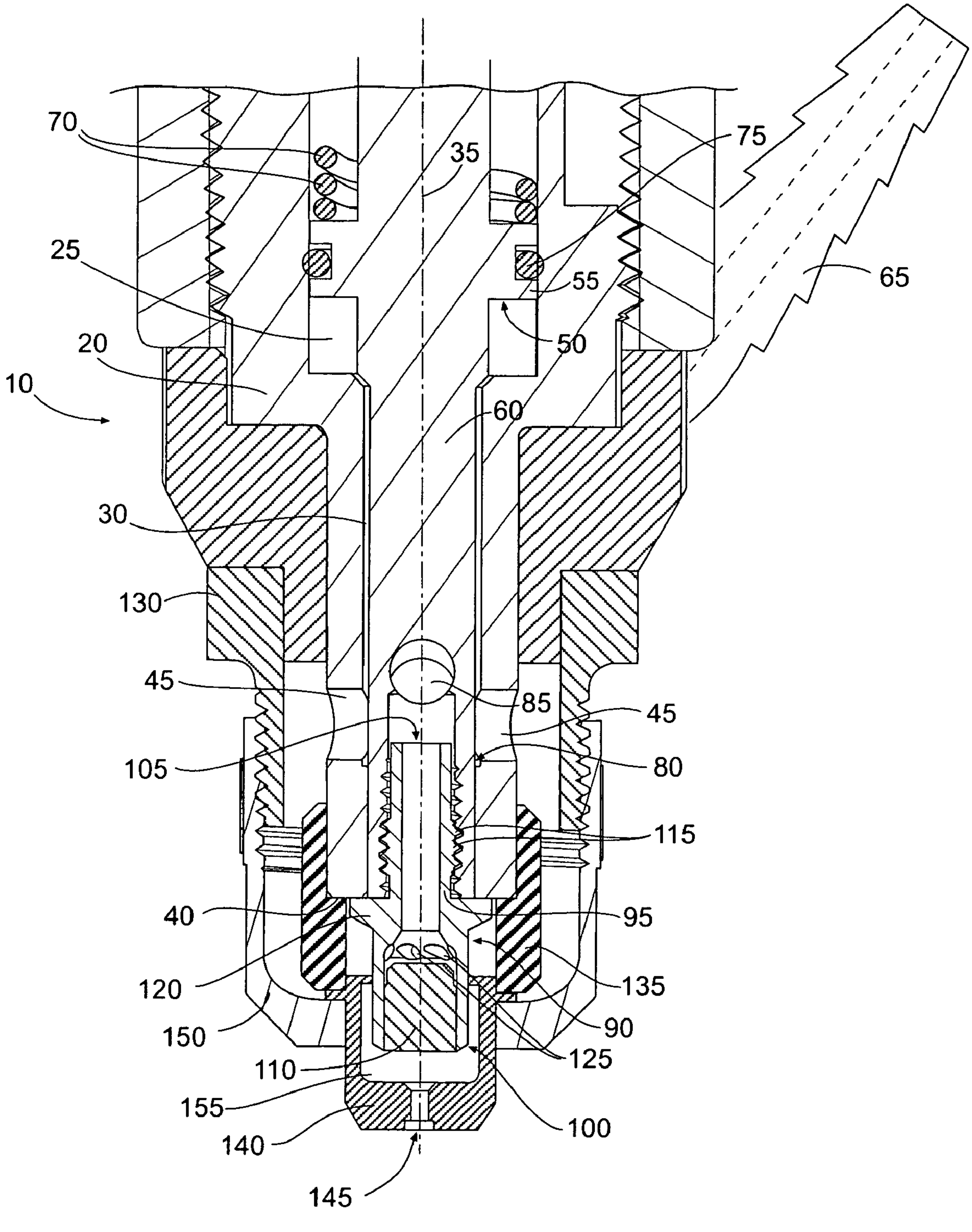

Having thus described the invention in general terms, reference will now be made to the accompanying drawings, which are not necessarily drawn to scale, and wherein:

FIG. 1 is a schematic of a plasma arc torch according to one embodiment of the present invention illustrating the electrode in an inoperative position in contact with the nozzle; and FIG. 2 is a schematic of a plasma arc torch according to one embodiment of the present invention, as shown in FIG. 1, illustrating the electrode in an operative position separated from the nozzle.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a plasma arc torch according to one embodiment of the present invention, the torch being indicated generally by the numeral 10. Such a torch 10 may be, for example, a blowback or touch-start type torch incorporating improved electrode cooling and safety provisions. As shown, the torch 10 includes a tubular member or housing 20 defining a bore comprising axial piston bore 25 extending to a smaller axial shaft bore 30 along an axis 35. The shaft bore 30 ends at an end surface 40 of the tubular member 20, wherein the end surface 40 is disposed opposite the shaft bore 30 from the piston bore 25. The portion of the tubular member 20 defining the shaft bore 30 also defines one or more holes or channels 45 extending generally perpendicularly to the axis 35, with the holes 45 extending through the tubular member 20. The holes 45 are axially disposed generally medially between the portion of the tubular member 20 defining the piston bore 25 and the end surface 40. The tubular member 20 further includes an inlet channel 65 extending to about the interface between the piston bore 25 and the shaft bore 30 so as to be in fluid communication with the bore.

A piston member 50 includes a piston portion 55 having a shaft portion 60 engaged therewith and extending axially therefrom. The piston member 50 is configured to be received within the tubular member 20 such that the piston portion 55 is axially movable within the piston bore 25 and the shaft portion 60 is axially movable within the shaft bore 30. The piston member 50 is normally biased toward the shaft bore 30 by, for example, a biasing member 70 acting against the piston portion 55. The piston portion 55 may also include, for example, a sealing ring 75 extending around the circumference thereof so as to form a movable seal with the inner surface of the portion of the tubular member 20 defining the piston bore 25. One skilled in the art will appreciate, however, that the piston portion 55 may be movably sealed with respect to the piston bore 25 in many different manners consistent with the spirit and scope of the present invention.

The portion of the shaft bore 30 disposed between the end surface 40 and the holes 45 in the tubular member 20 is generally configured to be closely toleranced with respect to the outer dimensions of the shaft portion 60 of the piston member 55, but with sufficient clearance to allow the shaft portion 60 to move axially therethrough. However, the portion of the shaft bore 30 disposed between the piston bore 25 and the holes 45 is generally oversized with respect to the shaft portion 60 of the piston member 50. Accordingly, a pressurized fluid such as, for example, air, from a fluid source (not shown) introduced through the inlet channel 65 into the bore cannot escape axially past the sealing ring 75 surrounding the piston portion 55 within the piston bore 25 and will thus flow axially between the shaft portion 60 and shaft bore 30, from the piston bore 25 to the holes 45 in the tubular member 20. Due to the close tolerance between the shaft portion 60 and the shaft bore 30, between the holes 45 and the end surface 40, the pressurized air will tend to flow through the holes 45.

In some instances, the end 80 of the shaft portion 60, opposite the piston portion 55, is generally tubular and internally threaded. The end 80 of the shaft portion 60 may also define one or more holes 85 disposed medially between the end 80 of the shaft portion 60 and the piston portion 55, with the holes 85 extending through the wall of the end 80 of the shaft portion 60. Thus, some of the pressurized air will also tend to flow through the holes 85 defined by the shaft portion 60 and into the end 80, in addition to outwardly of the tubular member 20 through the holes 45 extending therethrough. The internally threaded end 80 is further configured to receive a hollow electrode 90. The hollow electrode 90 generally includes a tubular holder 95 with opposed first and second portions 100, 105. The first portion 100 is configured to receive an emissive element 110 therein, for example, in a friction fit. The second portion 105 is at least partially externally threaded, with the threads 115 extending toward the first portion 100, wherein the threads 115 are configured to correspond to the internally threaded end 80 of the shaft portion 60. In one embodiment, the second portion 105 includes only several threads 115 medially disposed along the second portion 105.

Following termination of the threads 115 and medially between the first and second portions 100, 105, the holder 95 forms a radially outward extending flange 120. The flange 120 extends radially outward so as to extend past the internally threaded end 80 of the shaft portion 60. Thus, when the second portion 105 of the holder 95 is threaded into the internally threaded end 80 of the shaft portion 60, the flange 120 functions to stop the axial threaded engagement between the second portion 105 and the internally threaded end 80 upon contact with the internally threaded end 80. In this manner, such an embodiment of the present invention advantageously indicates to the assembler that the holder 95 has been completely and properly engaged with the shaft portion 60. That is, failure of the flange 120 to contact the end of the shaft portion 60 when axial progress of the threaded engagement is halted, would indicate to the assembler, for example, that the electrode 90 is cross-threaded in the shaft portion 60 or that either of the threads are damaged, or that there is some other impediment to full engagement between the components. The assembler will thus be notified of a possible safety and/or operational hazard risk before the remainder of the torch 10 is assembled.

In some instances, the flange 120 may also be configured to extend radially outward to a sufficient extent, for example, to be greater than the inner diameter of the tubular member 20, such that the flange 120 is capable of engaging the end surface 40 of the tubular member 20. In such an instance, the flange 120 also functions to limit the extent of axial travel of the shaft portion 60 of the piston member 50 toward the piston bore 25. That is, in addition to the flange 120 providing an indicator of complete and proper engagement between the holder 95 and the shaft portion 60, the flange 120 of a properly installed and/or assembled electrode 90 also limits the extent of axial travel of the shaft portion 60 and, as such, the axial travel of the piston portion 55. As a result, the properly installed and/or assembled electrode 90 may allow closer tolerances with respect to other components of the torch 10 wherein, for example, the axial travel of the piston portion 55 may be limited with respect to the axial travel of a properly installed and/or assembled electrode 90 due to the flange 120, thereby advantageously allowing, for instance, a more compact torch 10 to be constructed. In such an instance, the indicator function provided by the flange 120 may also serve to prevent the piston portion 55 from reaching its axial travel limit prior to the flange 120 limiting the axial travel thereof. That is, if the electrode 90 is not properly installed, whereby the flange 120 contacts the end of the shaft portion 60, the piston portion 55 may limit the axial travel of the electrode 90 and the electrode 90 may not "blow back" to the full operative position upon actuation of the torch 10. The flange 120 thus functions to ensure that such a condition will not occur.

As shown in FIGS. 1 and 2, the holder 95, between the flange 120 and the emissive element 110 received by the first portion 100, further defines one or more swirl holes 125 extending radially outward from the axis 35, through the wall of the tubular holder 95, between the flange 120 and the emissive element 110. In some instances, the one or more swirl holes 125 may be radially canted when extending through the wall of the holder 95. Accordingly, any of the pressurized air entering the one or more holes 85 defined by the shaft portion 60 will flow through the end 80 and into the holder 95, before exiting the holder 95 through the one or more swirl holes 125 defined by the holder 95. As such, any of the pressurized air emitted through the swirl holes 125 will be directed angularly around the first end of the electrode 90. As described further herein, the swirl holes 125 may, for example, enhance plasma formation in the plasma chamber 155 and promote cooling of the first portion 100 and the nozzle 140.

In some instances, a heat shield 130 extends about the tubular member 20 and is radially spaced apart from the tubular member 20, along at least a portion of the tubular member 20 defining the shaft bore 30. The heat shield 130 extends axially toward the end surface 40, and may be externally threaded. The nozzle 140 defines an axial nozzle bore 145 (through which the plasma is emitted) and is configured to generally surround the first portion 100 of the hollow electrode 90 carrying the emissive element 110. A shield cup 150 is configured to extend over the nozzle 140 and includes internal threads configured to interact with the external threads of the heat shield 130 so as to secure the nozzle 140 to the end surface 40 of the tubular member 20. For example, the nozzle 140 may be configured to extend axially through the shield cup 150, with the nozzle 140 having a retaining flange for interacting with the shield cup 150 in order to retain and secure the nozzle 140. One skilled in the art will appreciate, however, that there may be many different configurations of the components involved in securing the nozzle 140 with respect to the end surface 40 of the tubular member 20. For example, the heat shield 130 and the shield cup 150 may be provided as an integral assembly. In other instances, for instance, the shield cup 150 and the nozzle 140 may be an integral assembly. Accordingly, the configurations provided herein are for example only and are not intended to be limiting in this respect.

Further to the described configuration shown in FIGS. 1 and 2, the end surface 40 of the tubular member 20 may be, in some instances, configured to receive an axial spacer 135. The axial spacer 135, in turn, is configured to receive the nozzle 140 such that the axial spacer 135 is disposed between the end surface 40 and the nozzle 140, so as to provide appropriate spacing for accommodating the travel of the electrode 90. Such an axial spacer 135 may also be appropriately configured so as to allow, for example, an electrode 90 having a varied length of the first portion 100, in relation to the flange 120, to be used. In some instances, the nozzle 140 and/or the end surface 40 of the tubular member 20 may be configured to incorporate the structure of the axial spacer 135 such that the axial spacer 135 becomes unnecessary. In other instances, for example, the axial spacer 135 or axial spacer 135/nozzle 140 integral assembly may be configured to threadedly engage the end surface 40 of the tubular member 20, whereby such a threaded engagement may allow the nozzle 140 to be adjustable so as to accommodate an electrode having a different length.

The nozzle 140, the axial spacer 135 (if used), and the end surface 40 of the tubular member 20 thus cooperate to form the plasma chamber 155 in the torch 10. The electrode 90 is axially movable within the plasma chamber 155 between an inoperative position (as shown in FIG. 1) where the first portion 100/emissive element 110 contacts the inner surface of the nozzle 140, and an operative position (as shown in FIG. 2) where the electrode 90 is retracted into the tubular member 20 such that the flange 120 contacts the end surface 40 of the tubular member 20. The electrode 90 is capable of sufficient axial travel such that, in the inoperative position, the flange 120 is separated from the end surface 40 of the tubular member 20 and, in the operative position, the first portion 100/emissive element 110 of the electrode 90 is separated from the inner surface of the nozzle 140. One skilled in the art will appreciate, however, that limitation of the axial travel of the electrode 90 may be accomplished in different manners and that the limitation of the electrode 90 travel by the flange 120 is but one example. In some instances, for example, the flange 120 may be provided as an over-limit stop, wherein the operative position of the electrode 90 is at a lesser axial travel than the over-limit stop, and only an abnormal condition may cause the over-limit stop to halt the axial travel of the electrode 90. For example, the operative position of the electrode 90 may be determined by the air pressure or flow, or by the travel of the piston member 50.

In general, a blowback torch of the type described first requires the application of a voltage between the emissive element 110/electrode 90 and the nozzle 140, with the electrode 90 in the inoperative position. Subsequently, the pressurized air is introduced through the inlet channel 65 with sufficient pressure to act on the piston portion 55 of the piston member 50 so as to force the piston member 50, and thus the electrode 90, away from the nozzle 140. The pressurized air acting on the piston portion 55 thus provides the "blowback" and moves the electrode 90 to the operative position, whereby separation of the emissive element 110/electrode 90 from the nozzle 140 draws the arc therebetween. At the same time, the air flowing through the one or more holes 125 defined by the holder 95, via the shaft bore 30, the one or more holes 85 defined by the end 80 of the shaft portion 60 and the holder 95, enters the plasma chamber 155 and thus forms the plasma which exits the plasma chamber 155 through the nozzle bore 145 so as to allow the operator to cut the workpiece. Any of the pressurized air flowing through the holes 45 defined by the tubular member 20 flows into a space defined by the heat shield 130 and shield cup 150 so as to, for example, provide cooling of those components. In some instances, the shield cup 150 may define one or more apertures (not shown) angularly spaced apart about the nozzle 140, wherein, for example, such apertures may be configured such that the air flowing therethrough provides cooling for the external surface of the nozzle 140 disposed outside the shield cup 150.

In the operating position, any of the pressurized air flowing through the hollow electrode 90 and through the one or more holes 125 defined thereby, is directed into and through the plasma chamber 155, and eventually out the nozzle bore 145. In instances, where the one or more holes 125 defined by the holder 95 are radially canted, the pressurized air emitted therefrom may be caused to swirl around the plasma chamber 155. Since the pressurized air introduced through the air inlet channel 65 flows through the interior of the hollow electrode 90, as well as around the exterior of the first end 100 of the hollow electrode 90 in which the emissive element 100 is received, improved cooling for the electrode 90 and/or nozzle 140 of the blowback torch 10 may be realized, in addition to improved control and consistency of the plasma flow. Extended service life of the electrode 90, emissive element 110, and/or the nozzle 140 may also be realized.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A plasma torch, comprising:

a tubular member having opposing first and second ends and defining a bore extending axially between the ends;

a nozzle operably engaged with the first end of the tubular member;

a movable member movably engaged with the tubular member axially within the bore, the movable member having a first end disposed toward the nozzle and an opposing second end;

a piston member operably engaged with the movable member away from the first end thereof; and an electrode having a first portion defining a bore and configured to be received by the first end of the movable member, the electrode also having a second portion extending outwardly from the first end of the movable member toward the nozzle, the electrode having a radially outward-extending medial flange disposed between the first and second portions axially outward of the first end of the movable member, the electrode being configured to be movable by the piston member, via the movable member, between an inoperable position with the electrode in contact with the nozzle and an operable position with the electrode separated from the nozzle and the medial flange in contact with the first end of the tubular member.

2. A plasma torch according to claim 1 wherein the second portion of the electrode defines a bore configured to receive an emissive element therein.

3. A plasma torch according to claim 1 wherein electrode defines a plurality of radially outward-extending swirl holes, the swirl holes being radially canted.

4. A plasma torch according to claim 3 wherein the bore of the first portion of the electrode is in communication with the swirl holes.

5. A plasma torch according to claim 1 further comprising a fluid inlet member operably engaged with the tubular member and defining a channel extending to and in communication with the tubular member bore between the piston member and the electrode.

6. A plasma torch according to claim 5 further comprising a fluid source in communication with the fluid inlet member and configured to provide a fluid through the fluid inlet member channel into the tubular member bore.

7. A plasma torch according to claim 1 wherein the movable member defines an axially-extending bore in fluid communication with the bore of the first portion of the electrode, the movable member bore being in fluid communication with the tubular member bore via at least one laterally-extending channel defined by the movable member between the piston member and the first end of the movable member.

8. A plasma torch according to claim 1 further comprising a biasing member operably engaged between the tubular member and the movable member, the biasing member being configured to normally bias the movable member toward the nozzle.

9. A plasma torch according to claim 1 further comprising a shield cup having the nozzle extending axially therethrough and defining an interior extending over the electrode toward the tubular member.

10. A plasma torch according to claim 9 wherein the tubular member further defines at least one laterally-extending channel extending from the tubular member bore toward the interior of the shield cup such that the tubular member bore is in fluid communication with the interior of the shield cup.

11. A plasma torch according to claim 9 wherein the shield cup further defines at least one cooling bore outwardly of the nozzle, the at least one cooling bore being in fluid communication with the tubular member bore.

* * * * *